(12) United States Patent
Ichihara

(10) Patent No.: US 8,779,710 B2
(45) Date of Patent: Jul. 15, 2014

(54) INVERTER DEVICE

(71) Applicant: Masafumi Ichihara, Chiyoda-ku (JP)

(72) Inventor: Masafumi Ichihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/006,155

(22) PCT Filed: Dec. 14, 2012

(86) PCT No.: PCT/JP2012/082539
§ 371 (c)(1),
(2), (4) Date: Sep. 19, 2013

(65) Prior Publication Data
US 2014/0167660 A1     Jun. 19, 2014

(51) Int. Cl.
*H02P 27/00* (2006.01)
(52) U.S. Cl.
USPC ........................................... 318/400.3
(58) Field of Classification Search
None
See application file for complete search history.

(56) References Cited

U.S. PATENT DOCUMENTS

| 7,170,245 | B2 * | 1/2007 | Youm .......................... 318/375 |
| 8,154,242 | B2 * | 4/2012 | Whitehouse et al. .......... 320/101 |
| 2011/0006726 | A1 * | 1/2011 | Dittmer et al. ................ 320/101 |
| 2013/0128633 | A1 | 5/2013 | Ichihara |

FOREIGN PATENT DOCUMENTS

| JP | 63-7101 A | 1/1988 |
| JP | 3-159501 A | 7/1991 |
| JP | 11-178351 A | 7/1999 |
| JP | 11-289793 A | 10/1999 |
| JP | 2002-64901 A | 2/2002 |
| JP | 3572915 B2 | 10/2004 |
| JP | 2006-246569 A | 9/2006 |
| JP | 2010-98919 A | 4/2010 |
| JP | 2010-541533 A | 12/2010 |
| WO | 2012-014292 A1 | 2/2012 |

OTHER PUBLICATIONS

International Search Report for PCT/JP2012/082539 dated Mar. 19, 2013.
Korean Patent Office Action (Notice of Preliminary Rejection) dated Mar. 18, 2014, in Patent Application No. 10-2013-7027319.

* cited by examiner

*Primary Examiner* — Shawki S Ismail
*Assistant Examiner* — Zoheb Imtiaz
(74) *Attorney, Agent, or Firm* — Sughrue Mion, PLLC

(57) ABSTRACT

In the inverter device that receives DC power from the DC common bus and drives a load, the configuration is such that the switching element is arranged on the first current path in which current flows through the positive-side DC terminal during powering, the reverse-connected diode is arranged on the second current path in which current flows through the positive-side DC terminal during regeneration, the charging resistor is arranged on the third current path in which current flows through the positive-side DC terminal when the smoothing capacitor of the smoothing unit is initially charged, and the brake resistor is connected externally between the positive-side DC terminals such that the positive-side DC terminal becomes an end whose potential is the same as that of the positive-side bus of the DC common bus.

10 Claims, 7 Drawing Sheets

INVERTER DEVICE

CROSS REFERENCE TO RELATED APPLICATIONS

This application is a National Stage of International Application No. PCT/JP2012/082539 filed Dec. 14, 2012, the contents of which are incorporated herein by reference in their entirety.

FIELD

The present invention relates to an inverter device.

BACKGROUND

Conventional inverter devices that function as driving devices, for example, for driving motors (for example, induction motors), which are the loads, at variable speeds by using a commercial power supply are configured to include a converter rectifier (AC/DC conversion unit) connected to a commercial power supply, a smoothing unit that stores DC power, a charging circuit that includes a charging resistor, a switching element, and a reverse-connected diode, and charges the capacitor (smoothing capacitor) of the smoothing unit, an inverter unit (DC/AC conversion unit) connected to the motor, and the like.

Moreover, conventional inverter devices include positive and negative DC terminals (P, N) so as to operate by receiving power (DC power) from a DC common bus even if power is not supplied from a commercial power supply. Typically, a brake device for preventing overcurrent during regeneration is connected to this DC common bus. Moreover, this brake device is typically provided with a brake resistor that consumes power (regenerative power) during regeneration.

CITATION LIST

Patent Literature

Patent Literature 1: Japanese Patent Application Laid-open S63-7101

SUMMARY

Technical Problem

When a load device (for example, brake device) connected to the DC common bus has a large capacity, there is a high probability that the current that flows in this large-capacity brake device flows in a diode (what is called, a reverse-connected diode) in the inverter device. Although the large-capacity brake device has a current rating corresponding to its capacity, the reverse-connected diode normally only has a current rating corresponding to the capacity of the inverter device in which the reverse-connected diode is incorporated. Inverter devices of various capacities are connected to the DC common bus. For example, when the capacity of the inverter device is significantly lower than that of the large-capacity brake device, there is a problem in that a large brake current (or part thereof), which flows in the large-capacity brake device, flows in the reverse-connected diode and therefore the reverse-connected diode may be damaged.

Consideration is given to the configuration in which a current limiting resistor is added to the reverse-connected diode as described in Patent Literature 1. However, with the configuration in Patent Literature 1, there is a problem in that the current that flows in the inverter device during powering always flows in the current limiting resistor; therefore, heat generation increases and the efficiency decreases. Thus, this configuration is impractical.

The present invention is achieved in view of the above and has an object to provide an inverter device that can definitely prevent a reverse-connected diode provided in the device from being damaged even when a load device connected to a DC common bus has a large capacity.

Solution to Problem

In order to solve the above problems and achieve the object, in the present invention, the inverter device that receives DC power from a DC common bus and drives a load, includes a first positive-side DC terminal and a first negative-side DC terminal that receive DC power from the DC common bus; a second positive-side DC terminal that is different from the first positive-side DC terminal; a smoothing unit that stores DC power supplied from the first positive-side DC terminal and the first negative-side DC terminal; a DC/AC conversion unit that converts DC power supplied from the smoothing unit to AC power; and a current-path changing unit that includes a switching element that is arranged on a first current path in which current flows through the first positive-side DC terminal during powering, a reverse-connected diode that is arranged on a second current path in which current flows through the second positive-side DC terminal during regeneration, and a charging resistor that is arranged on a third current path in which current flows through the first positive-side DC terminal when a smoothing capacitor of the smoothing unit is initially charged, in which an external resistor is connected between the first positive-side DC terminal and the second positive-side DC terminal such that the first positive-side DC terminal becomes an end whose potential is same as that of a positive-side bus of the DC common bus.

Advantageous Effects of Invention

According to this invention, an effect can be obtained where a small-capacity inverter device can be connected to a DC common bus that includes a large-capacity load device.

DESCRIPTION OF EMBODIMENT

An inverter device according to an embodiment of the present invention is described below with reference to the accompanying drawings. The present invention is not limited to the embodiment described below.

Figure 1:
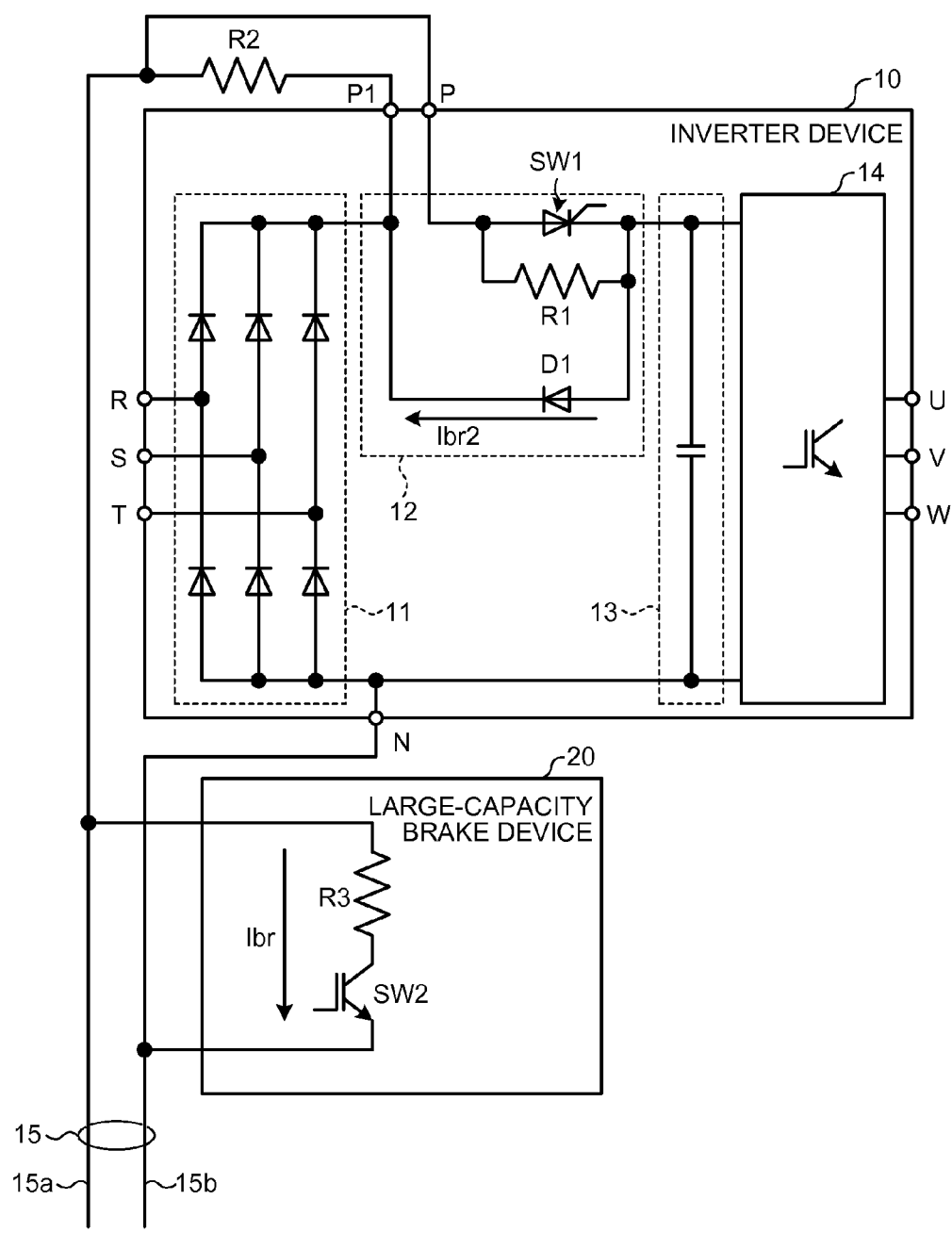
FIG. 1 is a diagram illustrating the circuit configuration of an inverter device according to an embodiment of the present invention.

FIG. 1 is a diagram illustrating the circuit configuration of an inverter device according to the embodiment of the present invention. As illustrated in FIG. 1, an inverter device 10 according to the first embodiment is configured to include a converter 11 that is an AC/DC conversion unit, a charging circuit 12, a smoothing unit 13 that includes a smoothing capacitor, and a DC/AC conversion unit 14.

Moreover, the inverter device 10 includes AC power supply terminals R, S, and T, a DC terminal (first positive-side DC terminal) P that is electrically connected to a positive-side bus 15a of a DC common bus 15, a DC terminal (second positive-side DC terminal) P1 that is electrically connected to the positive-side bus 15a via a brake resistor R2, which will be described later, a DC terminal (first negative-side DC terminal) N that is electrically connected to a negative-side bus 15b of the DC common bus 15, and load connection terminals U, V, and W to which a load (not illustrated), such as a motor, is connected.

In the converter 11, for example, a plurality of diodes form a full-bridge circuit, and the converter 11 converts three-phase AC power supplied from the AC power supply terminals R, S, and T to DC power. The output of the converter 11 is supplied to the DC common bus 15 via the positive-side DC terminal P1 and the negative-side DC terminal N. Moreover, the output of the converter 11 is applied across the positive-side DC terminal P and the negative-side DC terminal N via the brake resistor R2, which will be described later.

The smoothing unit 13 stores DC power converted by the converter 11 in the smoothing capacitor via the brake resistor R2 and the charging circuit 12. Moreover, the smoothing unit 13 stores DC power from the DC common bus 15 in the smoothing capacitor via the charging circuit 12 (without the DC power coming via the brake resistor R2).

The DC/AC conversion unit 14 includes at least one voltage source bridge circuit having an upper-and-lower arm configuration in which switching elements are connected in series and drives a load (not illustrated) by converting DC power supplied from the smoothing unit 13 to AC power.

The charging circuit 12 is configured to include a switching element SW1, a charging resistor R1, and a reverse-connected diode D1. The switching element SW1 is a unidirectional switching element (for example, a thyristor) and is arranged between the positive-side DC terminal P and the positive side input of the DC/AC conversion unit 14 such that a current path (directed toward the DC/AC conversion unit 14 from the positive-side bus 15a) during powering is formed. The charging resistor R1 is arranged such that it is connected in parallel across the switching element SW1 so that the inrush current when the smoothing capacitor is initially charged is limited. In other words, the charging resistor R1 is arranged on the current path in which current flows when the smoothing capacitor is initially charged. The reverse-connected diode D1 is arranged such that the cathode is connected to the positive-side DC terminal P1 and the anode is connected to the positive-side input side of the DC/AC conversion unit 14 to form a current path (directed toward the positive-side bus 15a from the DC/AC conversion unit 14) during regeneration.

As described above, the charging circuit 12 has a function as a current-path changing unit that automatically changes the current path between three current paths in accordance with the operational mode. The three current paths include a path (current path through the switching element: first current path) of current that flows through the positive-side DC terminal P during powering, a path (current path through the reverse-connected diode: second current path) of current that flows through the positive-side DC terminal P1 during regeneration, and a path (current path through the charging resistor R1: third current path) of current that flows through the positive-side DC terminal P when the smoothing capacitor is initially charged.

The brake resistor R2, which is externally connected, is provided between the positive-side DC terminals P and P1. At this point, connection is made such that the potential of the positive-side DC terminal P among the positive-side DC terminals P and P1 is the same as the potential of the positive-side bus 15a.

Moreover, a large-capacity brake device 20 is connected to the DC common bus 15. The large-capacity brake device 20 is provided with a brake resistor R3 that is connected in series with a switching element SW2. The brake resistor R3 consumes regenerative electric power (electrical energy) by converting the regenerative electric power to thermal energy.

Next, the operation of the main portions of the inverter device configured as illustrated in FIG. 1 will be explained with reference to FIG. 1.

First, a case is considered in which the large-capacity brake device 20 connected to the DC common bus 15 operates and the brake current Ibr as illustrated in FIG. 1 flows. At this point, although the brake current Ibr2 as illustrated in FIG. 1 also flows in the inverter device 10, this brake current Ibr2 is suppressed by the external brake resistor R2. Therefore, the current that flows in the reverse-connected diode D1 can be reduced and thus the reverse-connected diode D1 can be prevented from being damaged.

If the variation of the DC bus voltage while the large-capacity brake device 20 is operating is ΔV, a forward drop voltage of the reverse-connected diode is Vd1, and an allowable current value of the reverse-connected diode D1 is Id1, a value Rr of the brake resistor R2 can be obtained by using the following equation:

$$Rr = (\Delta V - Vd1)/Id1 \qquad (1)$$

With reference to FIG. 1, the path of the regenerative current includes a path that is directed toward the positive-side bus 15a via the charging resistor R1 in addition to the path that is directed toward the positive-side bus 15a via the reverse-connected diode D1 and the brake resistor R2. However, because the brake resistor R2 is selected such that the resistance thereof is smaller than that of the charging resistor R1, most of the regenerative current can be directed to the path through the brake resistor R2.

Figure 2:
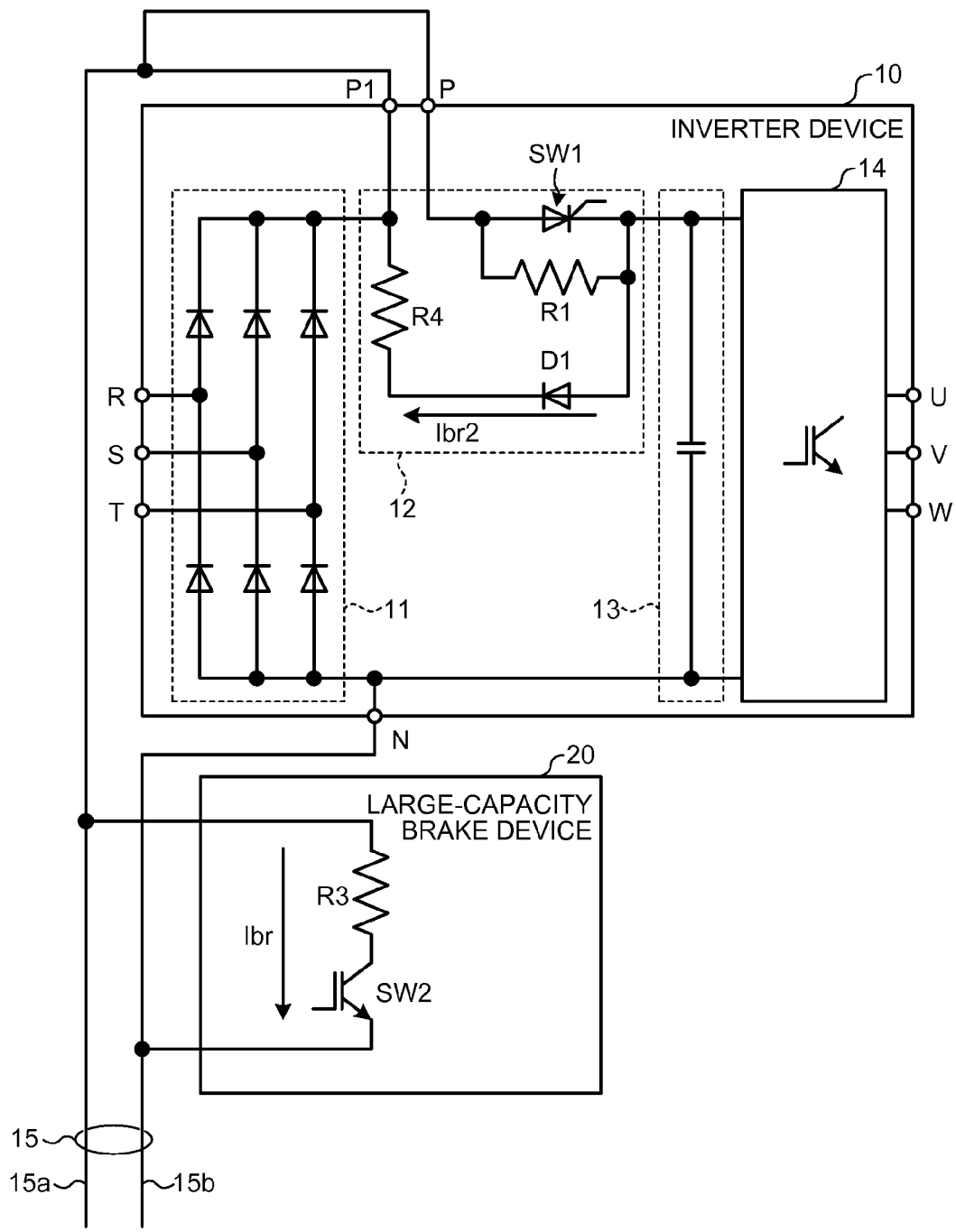
FIG. 2 is a diagram illustrating another circuit configuration (a brake resistor is incorporated) of the inverter device according to the embodiment.

The inverter device according to the present embodiment may be configured as illustrated in FIG. 2. In FIG. 2, a brake resistor R4 incorporated in the inverter device is provided instead of the external brake resistor R2. In FIG. 2, the brake resistor R4 is connected to the positive-side DC terminal P1; however, it may be such that the order of connection of the brake resistor R4 and the reverse-connected diode D1 is reversed, the cathode of the reverse-connected diode D1 is connected to the positive-side DC terminal P1, and one end of the brake resistor R4 is connected to the anode of the reverse-connected diode D1.

Figure 3:
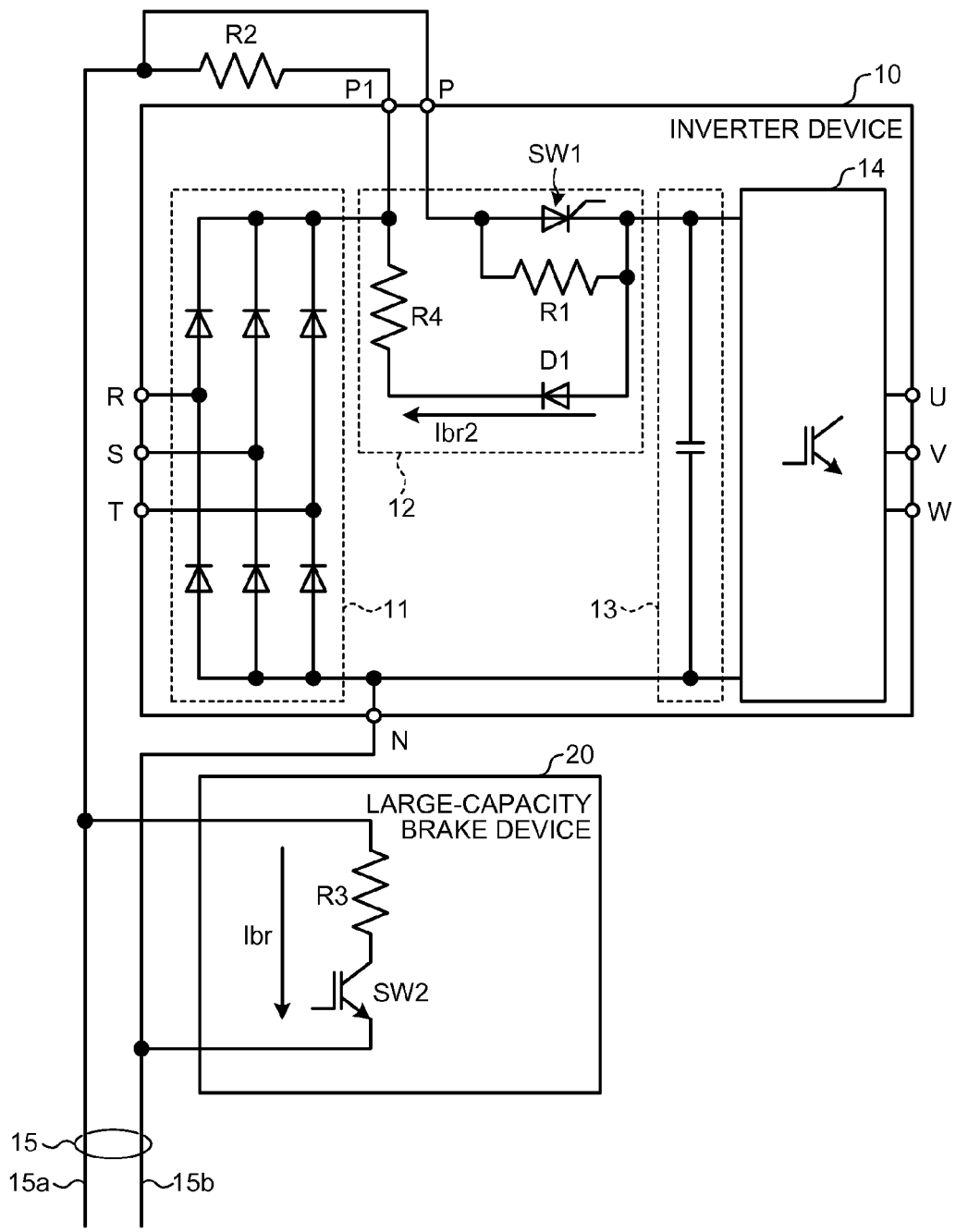
FIG. 3 is a diagram illustrating another circuit configuration (a brake resistor is incorporated and a brake resistor is arranged externally) of the inverter device according to the embodiment.

Moreover, in the configuration in FIG. 2, when the resistance is insufficient with only the brake resistor R4, it is satisfactory to add the external brake resistor R2 as illustrated in FIG. 3. With the configuration in FIG. 3, an effect can be obtained where the resistance and the capacitance of the external brake resistor R2 can be reduced compared with the case of FIG. 1.

Moreover, if it is assumed that the configuration is that illustrated in FIG. 3, i.e., if the configuration is such that the brake resistor R4 is included in the charging circuit 12 and the external brake resistor R2 is included, then, if a sufficient resistance can be obtained with the brake resistor R4, the resistance of the brake resistor R2 may be set to zero, i.e., the brake resistor R2 may be removed.

Figure 4:
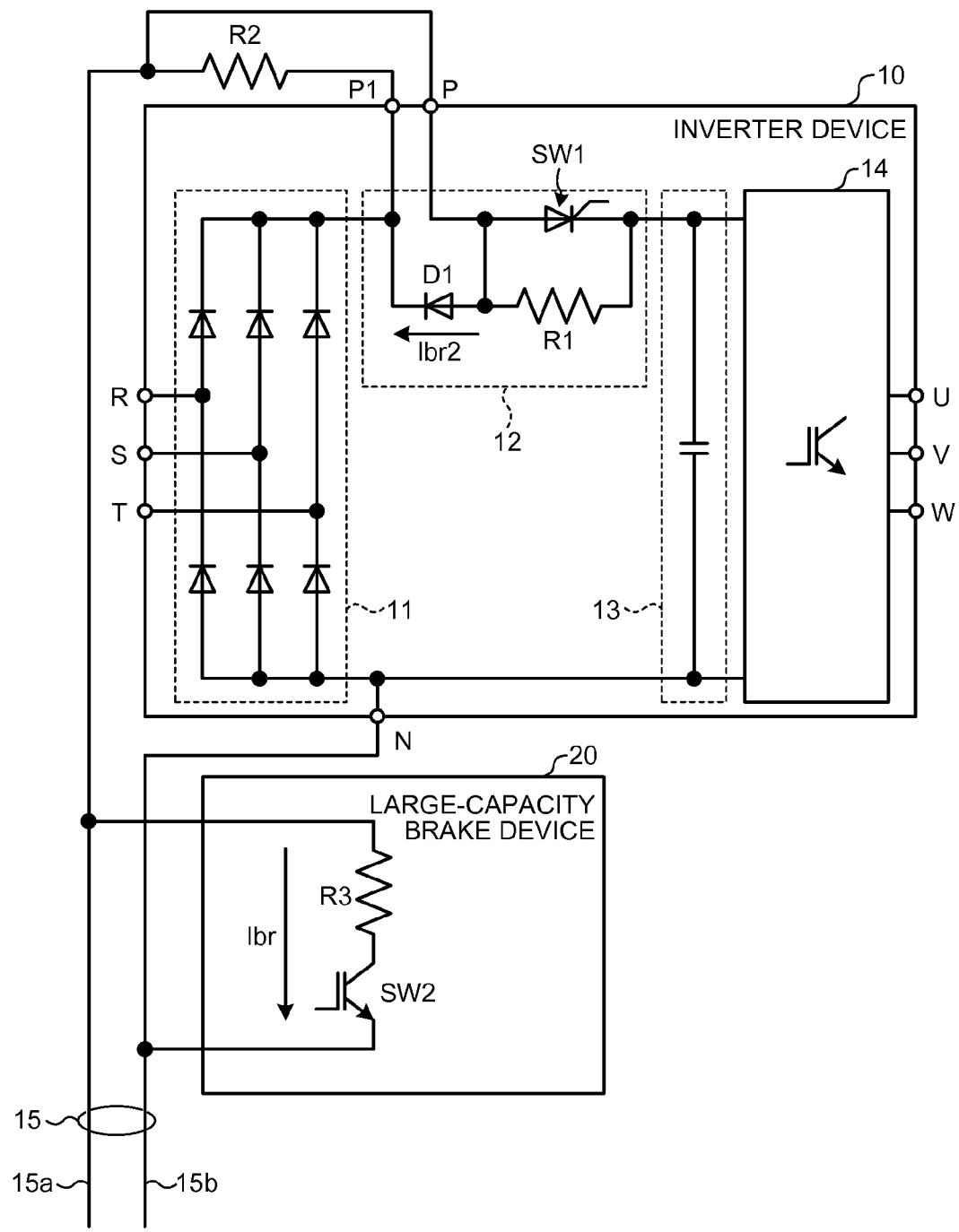
FIG. 4 is a diagram illustrating another circuit configuration (connection position of a reverse-connected diode is changed) of the inverter device according to the embodiment.

Moreover, the inverter device according to the present embodiment may be configured as illustrated in FIG. 4. In FIG. 4, the end of the charging resistor R1 on the side that is not connected to the DC/AC conversion unit 14 is connected to the anode of the reverse-connected diode D1 so that the charging resistor R1 is included in the current path during regeneration. With this connection, the brake current Ibr2 flows in the charging resistor R1; therefore, the capacitance value of the external brake resistor R2 can be reduced (or can be omitted depending on the case). At this point, the brake resistor R4 may be incorporated as illustrated in FIG. 2. In such a case, the capacitance value of the brake resistor R2 can be further reduced. Moreover, in a similar manner to the case of FIG. 3, when the resistance of the brake resistor R4 is sufficiently large, the resistance of the brake resistor R2 may be set to zero, i.e., the brake resistor R2 may be removed.

Figure 5:
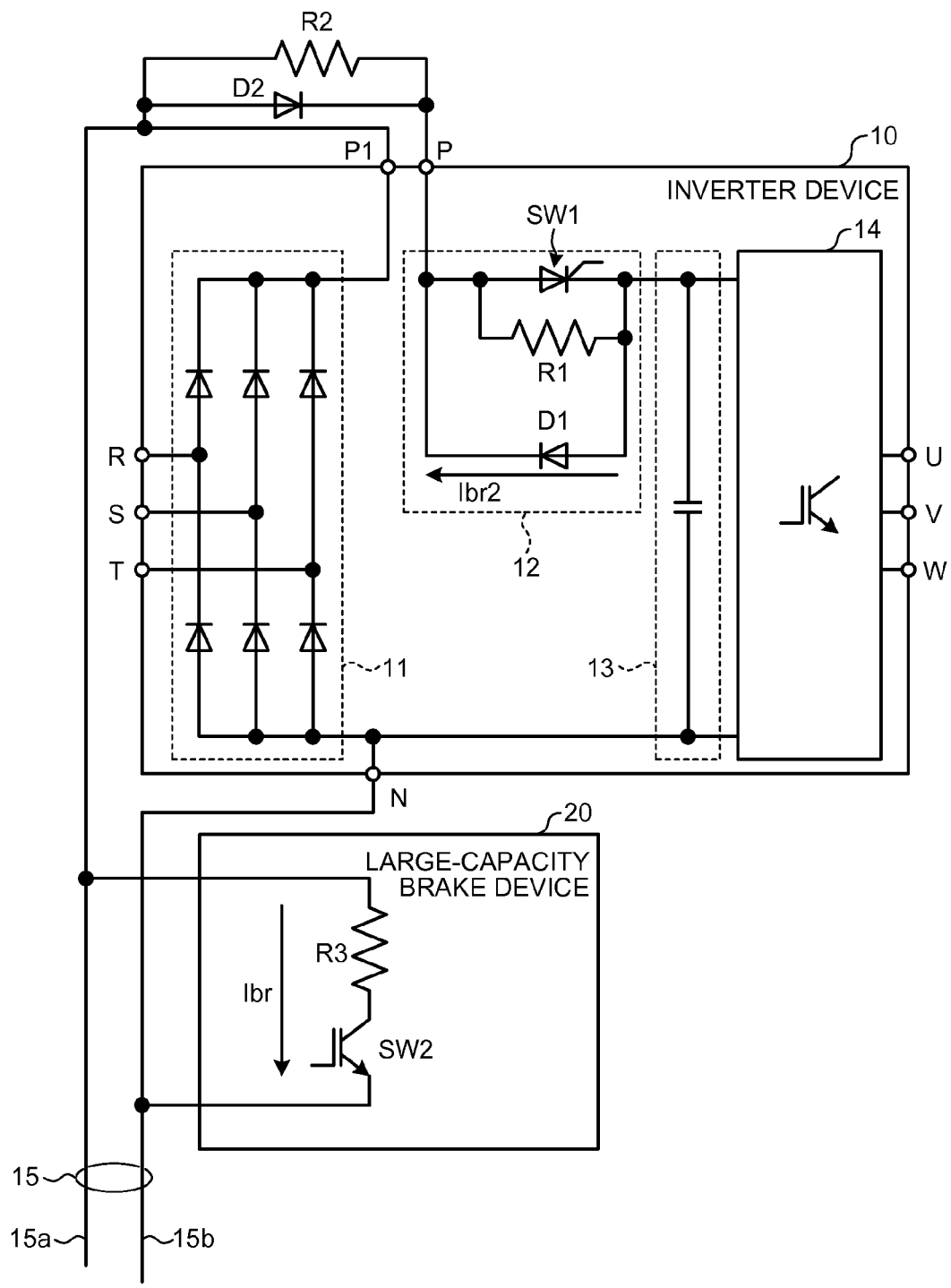
FIG. 5 is a diagram illustrating another circuit configuration (a powering diode is arranged externally) of the inverter device according to the embodiment.

Moreover, the inverter device according to the present embodiment may be configured as illustrated in FIG. 5. In the inverter device 10 illustrated in FIG. 5, the connection of the reverse-connected diode D1 in the charging circuit 12 is different from that in FIG. 1. In FIG. 1, the reverse-connected diode D1 is connected to the positive-side DC terminal P1; however, in FIG. 5, the reverse-connected diode D1 is connected to the positive-side DC terminal P together with the charging resistor R1. Therefore, in the configuration in FIG. 5, the external brake resistor R2 needs to be connected between the positive-side bus 15a and the positive-side DC terminal P. However, with this configuration, the current that flows during powering also flows in the brake resistor R2, which is not preferable. Thus, a powering diode D2 is connected in parallel across the brake resistor R2 in the direction in which the powering current flows. With such a configuration, most of the current during powering flows in the path through the powering diode D2 and the switching element SW1 and most of the current during regeneration flows in the path through the reverse-connected diode D1 and the brake resistor R2; therefore, the reverse-connected diode D1 can be definitely prevented from being damaged while reducing the loss during powering.

Figure 6:
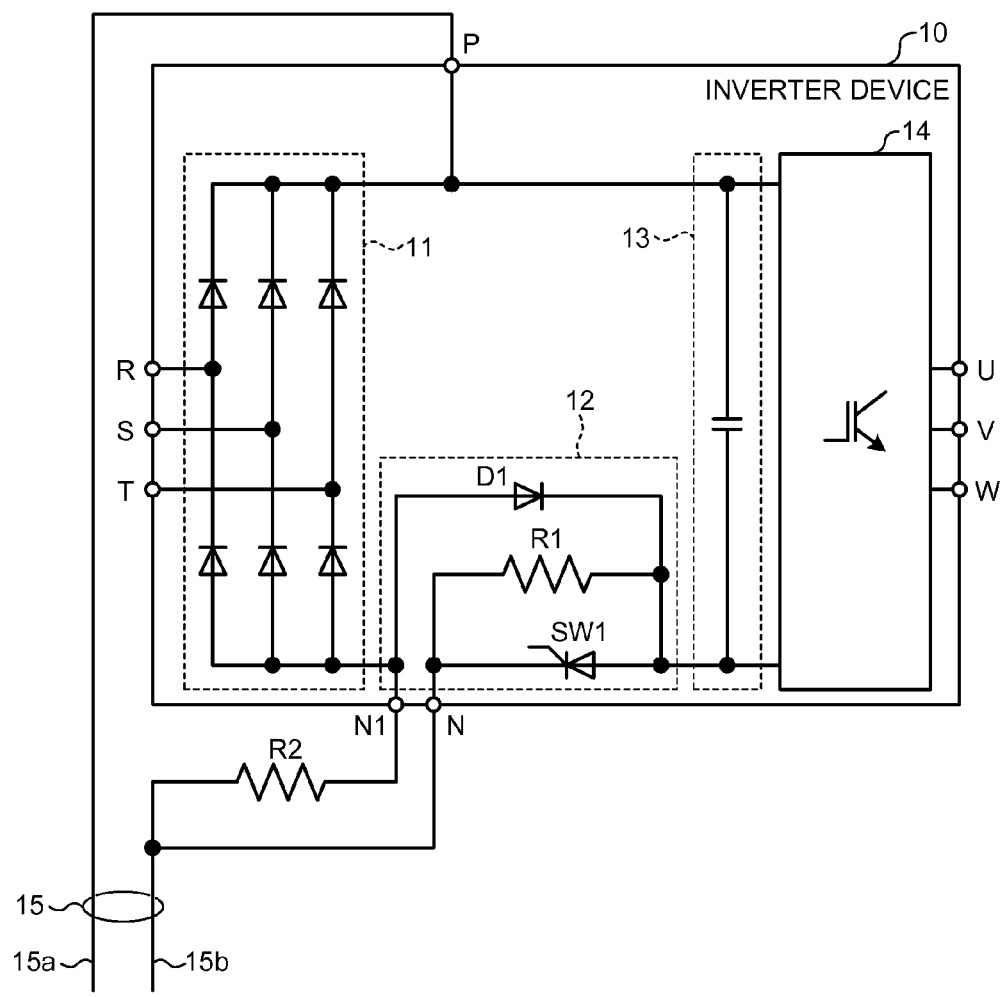
FIG. 6 is a diagram illustrating another circuit configuration (a charging circuit is arranged on the N side) of the inverter device according to the embodiment.

The above configurations are such that the charging circuit 12 is arranged on the positive side (P side); however, the charging circuit 12 may be arranged on the negative side (N side) as illustrated in FIG. 6. The inverter device 10 illustrated in FIG. 6 is provided with a DC terminal (second negative-side DC terminal) N1 instead of the positive-side DC terminal P1.

In FIG. 6, the switching element SW1 is connected between the negative-side input of the DC/AC conversion unit 14 and the negative-side DC terminal N such that a current path (directed toward the negative-side bus 15b from the DC/AC conversion unit 14) during powering is formed. The charging resistor R1 is connected in parallel across the switching element SW1 so that the inrush current when the smoothing capacitor is charged is limited. The reverse-connected diode D1 is arranged such that the anode is connected to the negative-side DC terminal N1 and the cathode is connected to the negative-side input side of the DC/AC conversion unit 14 to form a current path (directed toward the DC/AC conversion unit 14 from the negative-side bus 15b) during regeneration. Moreover, the brake resistor R2 is arranged externally between the negative-side DC terminals N and N1. At this point, connection is made such that the potential of the negative-side DC terminal N among the negative-side DC terminals N and N1 is the same as the potential of the negative-side bus 15b.

The circuit operation of the inverter device 10 in FIG. 6 is similar to that of the inverter device 10 in FIG. 1; therefore, a detailed explanation is omitted. Thus, the inverter device 10 in FIG. 6 has an operational effect similar to that of the inverter device 10 in FIG. 1.

In FIG. 6, the configuration in which the charging circuit 12 is arranged on the negative-electrode side is applied to the configuration in FIG. 1; however, it is obvious that it can also be applied to the configurations in FIG. 2 to FIG. 5.

Figure 7:
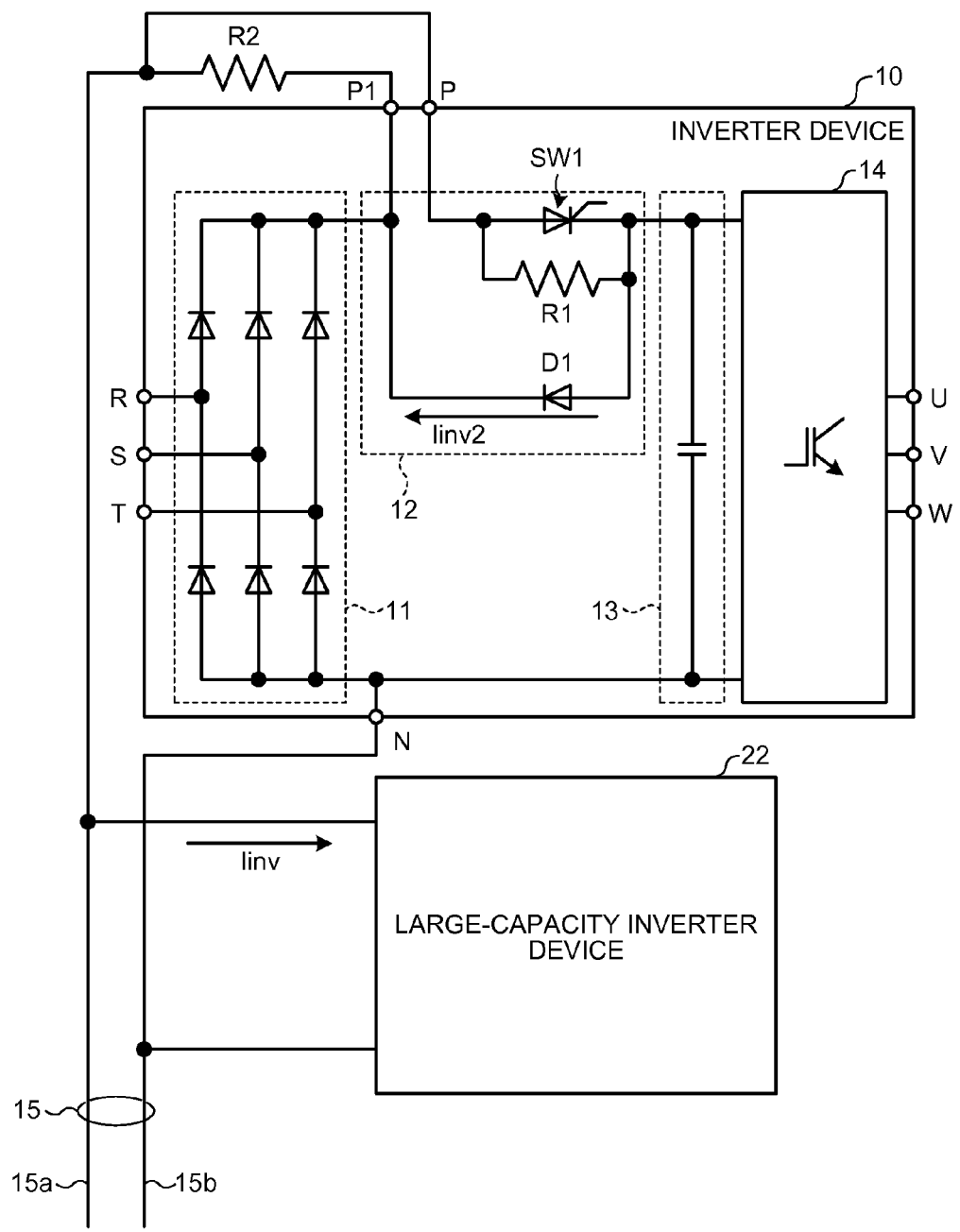
FIG. 7 is a diagram illustrating another form of the inverter device according to the embodiment.

FIG. 7 is a diagram illustrating a form in which a large-capacity inverter device 22 is connected to the DC common bus 15 instead of the large-capacity brake device 20.

In FIG. 7, a case is considered in which the load current Iinv of a load, such as the large-capacity inverter device 22, connected to the DC common bus 15 is rapidly increased. In such a case, when the DC/AC conversion unit 14 of the inverter device 10 generates regenerative power, part of the load current Iinv may flow in the reverse-connected diode D1. However, the brake resistor R2 is provided on this path; therefore, the current Iinv2, which flows in the reverse-connected diode D1, can be reduced.

As described above, the inverter device according to the present embodiment is effective also in the case where a load other than the large-capacitor brake device is connected to the DC common bus.

Next, the material of the reverse-connected diode D1 will be explained. Silicon (Si) is typically used as a material for a semiconductor element. However, it is of course possible to use silicon carbide (SiC), which has received attention in recent years.

An SiC element has excellent characteristics, such as high thermal conductivity and the ability to operate at high temperatures, compared with an Si element. With the use of an SiC element for the reverse-connected diode D1, the benefits of an SiC element can be obtained. Specifically, because an SiC element has a low conduction loss, effects are obtained where the loss of the entire inverter device can be reduced and heat generation of the inverter device side can be suppressed.

SiC is one example of the semiconductors referred to as a wide bandgap semiconductor due to the characteristic being that SiC has a larger bandgap than Si. In addition to SiC, for example, a semiconductor formed by using a gallium nitride-based material or diamond is also a wide bandgap semiconductor and the characteristics thereof have a lot of similarities to those of silicon carbide. Therefore, a configuration in which a wide bandgap semiconductor other than SiC is used is also within the scope of the present invention.

As described above, according to the inverter device in the present embodiment, the configuration is such that the switching element SW1 is arranged on the first current path in which current flows through the positive-side DC terminal P during powering, the reverse-connected diode D1 is arranged on the second current path in which current flows through the positive-side DC terminal P1 during regeneration, the charging resistor R1 is arranged on the third current path in which current flows through the positive-side DC terminal P when the smoothing capacitor of the smoothing unit 13 is initially charged, and the brake resistor R2 is connected between the positive-side DC terminals P and P1 such that the positive-side DC terminal P becomes an end whose potential is the same as that of the positive-side bus 15a of the DC common bus 15. Therefore, even if the load device connected to the DC common bus 15 has a large capacity, the reverse-connected diode D1 can be definitely prevented from being damaged.

Moreover, according to the inverter device in the present embodiment, the switching element SW1 is arranged on the first current path in which current flows through the positive-side DC terminal P during powering, the reverse-connected diode D1 is arranged on the second current path in which current flows through the positive-side DC terminal P1 during regeneration, the charging resistor R1 is arranged on the third current path in which current flows through the positive-side DC terminal P when the smoothing capacitor of the smoothing unit 13 is initially charged, connection is made such that each of the positive-side DC terminals P and P1 becomes an end whose potential is the same as that of the positive-side bus 15a of the DC common bus 15, and the brake resistor R4, which is connected in series with the reverse-connected diode D1, is arranged between the positive-side DC terminal P1 and the positive-side input of the DC/AC conversion unit 14. Therefore, even if the load device connected to the DC common bus 15 has a large capacity, the reverse-connected diode D1 can be definitely prevented from being damaged.

Moreover, according to the inverter device in the present embodiment, the configuration is such that the switching element SW1 is arranged on the first current path in which current flows through the positive-side DC terminal P during powering, the reverse-connected diode D1 is arranged on the second current path in which current flows through the positive-side DC terminal P1 during regeneration, the charging resistor R1 is arranged such that it is connected in series with the reverse-connected diode D1 and current through the positive-side DC terminal P also flows when the smoothing capacitor of the smoothing unit 13 is initially charged, and the brake resistor R2 is connected between the positive-side DC terminals P and P1 such that the positive-side DC terminal P becomes an end whose potential is the same as that of the positive-side bus 15a of the DC common bus 15. Therefore, even if the load device connected to the DC common bus 15 has a large capacity, the reverse-connected diode D1 can be definitely prevented from being damaged.

Furthermore, according to the inverter device in the present embodiment, the configuration is such that the switching element SW1 is arranged on the first current path in which current flows through the positive-side DC terminal P during powering, the reverse-connected diode D1 is arranged on the second current path in which current flows through the positive-side DC terminal P1 during regeneration, the charging resistor R1 is arranged on the third current path in which current flows through the positive-side DC terminal P when the smoothing capacitor of the smoothing unit 13 is initially charged, and the brake resistor R2 is connected between the positive-side DC terminals P and P1 and the powering diode D2 is connected across the brake resistor R2 in the direction in which the powering current flows such that the positive-side DC terminal P1 becomes an end whose potential is the same as that of the positive-side bus 15a of the DC common bus 15. Therefore, even if the load device connected to the DC common bus 15 has a large capacity, the reverse-connected diode D1 can be definitely prevented from being damaged.

Moreover, according to the inverter device in the present embodiment, the configuration is such that the switching element SW1 is arranged on the first current path in which current flows through the negative-side DC terminal N during powering, the reverse-connected diode D1 is arranged on the second current path in which current flows through the negative-side DC terminal N1 during regeneration, the charging resistor R1 is arranged on the third current path in which current flows through the negative-side DC terminal N when the smoothing capacitor of the smoothing unit 13 is initially charged, and the brake resistor R2 is connected between the negative-side DC terminals N and N1 such that the negative-side DC terminal N becomes an end whose potential is the same as that of the negative-side bus 15b of the DC common bus 15. Therefore, even if the load device connected to the DC common bus 15 has a large capacity, the reverse-connected diode D1 can be definitely prevented from being damaged.

The configurations illustrated in the above embodiment are examples of the configuration of the present invention and it is obvious that the configurations can be combined with other publicly known technologies and the configurations can be changed, for example, by omitting a part thereof without departing from the scope of the present invention.

INDUSTRIAL APPLICABILITY

As described above, the present invention is useful as an inverter device capable of definitely preventing a reverse-connected diode provided in the device from being damaged.

REFERENCE SIGNS LIST 10 inverter device, 11 converter, 12 charging circuit (current-path changing unit), 13 smoothing unit, DC/AC conversion unit, 15 DC common bus, 15a positive-side bus, 15b negative-side bus, 20 large-capacity brake device, 22 large-capacity inverter device

The invention claimed is:

1. An inverter device that receives DC power from a DC common bus and drives a load, comprising:
    a first positive-side DC terminal and a first negative-side DC terminal that receive DC power from the DC common bus;
    a second positive-side DC terminal that is different from the first positive-side DC terminal;
    a smoothing unit that stores DC power supplied from the first positive-side DC terminal and the first negative-side DC terminal;
    a DC/AC conversion unit that converts DC power supplied from the smoothing unit to AC power; and
    a current-path changing unit that includes
        a switching element that is arranged on a first current path in which current flows through the first positive-side DC terminal during powering,
        a reverse-connected diode that is arranged on a second current path in which current flows through the second positive-side DC terminal during regeneration, and
        a charging resistor that is arranged on a third current path in which current flows through the first positive-side DC terminal when a smoothing capacitor of the smoothing unit is initially charged, wherein
    an external resistor is connected between the first positive-side DC terminal and the second positive-side DC terminal such that the first positive-side DC terminal becomes an end whose potential is same as that of a positive-side bus of the DC common bus.

2. An inverter device that receives DC power from a DC common bus and drives a load, comprising:
    a first positive-side DC terminal and a first negative-side DC terminal that receive DC power from the DC common bus;

a second positive-side DC terminal that is different from the first positive-side DC terminal;
a smoothing unit that stores DC power supplied from the first positive-side DC terminal and the first negative-side DC terminal;
a DC/AC conversion unit that converts DC power supplied from the smoothing unit to AC power; and
a current-path changing unit that includes
a switching element that is arranged on a first current path in which current flows through the first positive-side DC terminal during powering,
a reverse-connected diode that is arranged on a second current path in which current flows through the second positive-side DC terminal during regeneration, and
a charging resistor that is arranged on a third current path in which current flows through the first positive-side DC terminal when a smoothing capacitor of the smoothing unit is initially charged, wherein
connection is made such that each of the first positive-side DC terminal and the second positive-side DC terminal becomes an end whose potential is same as that of a positive-side bus of the DC common bus, and
a resistor, which is connected in series with the reverse-connected diode, is arranged between the second positive-side DC terminal and a positive-side input of the DC/AC conversion unit.

3. The inverter device according to claim 2, wherein an external resistor is provided between the second positive-side DC terminal and the positive-side bus of the DC common bus.

4. An inverter device that receives DC power from a DC common bus and drives a load, comprising:
a first positive-side DC terminal and a first negative-side DC terminal that receive DC power from the DC common bus;
a second positive-side DC terminal that is different from the first positive-side DC terminal;
a smoothing unit that stores DC power supplied from the first positive-side DC terminal and the first negative-side DC terminal;
a DC/AC conversion unit that converts DC power supplied from the smoothing unit to AC power; and
a current-path changing unit that includes
a switching element that is arranged on a first current path in which current flows through the first positive-side DC terminal during powering,
a reverse-connected diode that is arranged on a second current path in which current flows through the second positive-side DC terminal during regeneration, and
a charging resistor that is arranged on the second current path such that the charging resistor is connected in series with the reverse-connected diode and in which current through the first positive-side DC terminal also flows when a smoothing capacitor of the smoothing unit is initially charged, wherein
an external resistor is connected between the first positive-side DC terminal and the second positive-side DC terminal such that the first positive-side DC terminal becomes an end whose potential is same as that of a positive-side bus of the DC common bus.

5. An inverter device that receives DC power from a DC common bus and drives a load, comprising:
a first positive-side DC terminal and a first negative-side DC terminal that receive DC power from the DC common bus;
a second positive-side DC terminal that is different from the first positive-side DC terminal;
a smoothing unit that stores DC power supplied from the first positive-side DC terminal and the first negative-side DC terminal;
a DC/AC conversion unit that converts DC power supplied from the smoothing unit to AC power; and
a current-path changing unit that includes
a switching element that is arranged on a first current path in which current flows through the first positive-side DC terminal during powering,
a reverse-connected diode that is arranged on a second current path in which current flows through the first positive-side DC terminal during regeneration, and
a charging resistor that is arranged on a third current path in which current flows through the first positive-side DC terminal when a smoothing capacitor of the smoothing unit is initially charged, wherein
an external resistor is connected between the first positive-side DC terminal and the second positive-side DC terminal and a powering diode is connected across the external resistor in a direction in which powering current flows such that the second positive-side DC terminal becomes an end whose potential is same as that of a positive-side bus of the DC common bus.

6. An inverter device that receives DC power from a DC common bus and drives a load, comprising:
a first positive-side DC terminal and a first negative-side DC terminal that receive DC power from the DC common bus;
a second negative-side DC terminal that is different from the first negative-side DC terminal;
a smoothing unit that stores DC power supplied from the first positive-side DC terminal and the first negative-side DC terminal;
a DC/AC conversion unit that converts DC power supplied from the smoothing unit to AC power; and
a current-path changing unit that includes
a switching element that is arranged on a first current path in which current flows through the first negative-side DC terminal during powering,
a reverse-connected diode that is arranged on a second current path in which current flows through the second negative-side DC terminal during regeneration, and
a charging resistor that is arranged on a third current path in which current flows through the first negative-side DC terminal when a smoothing capacitor of the smoothing unit is initially charged, wherein
an external resistor is connected between the first negative-side DC terminal and the second negative-side DC terminal such that the first negative-side DC terminal becomes an end whose potential is same as that of a negative-side bus of the DC common bus.

7. An inverter device that receives DC power from a DC common bus and drives a load, comprising:
a first positive-side DC terminal and a first negative-side DC terminal that receive DC power from the DC common bus;
a second negative-side DC terminal that is different from the first negative-side DC terminal;
a smoothing unit that stores DC power supplied from the first positive-side DC terminal and the first negative-side DC terminal;
a DC/AC conversion unit that converts DC power supplied from the smoothing unit to AC power; and a current-path changing unit that includes
- a switching element that is arranged on a first current path in which current flows through the first negative-side DC terminal during powering,
- a reverse-connected diode that is arranged on a second current path in which current flows through the second negative-side DC terminal during regeneration, and
- a charging resistor that is arranged on a third current path in which current flows through the first negative-side DC terminal when a smoothing capacitor of the smoothing unit is initially charged, wherein connection is made such that each of the first negative-side DC terminal and the second negative-side DC terminal becomes an end whose potential is same as that of a negative-side bus of the DC common bus, and a resistor, which is connected in series with the reverse-connected diode, is arranged between the second negative-side DC terminal and a negative-side input of the DC/AC conversion unit.

8. The inverter device according to claim 7, wherein an external resistor is provided between the second negative-side DC terminal and the negative-side bus of the DC common bus.

9. An inverter device that receives DC power from a DC common bus and drives a load, comprising:
- a first positive-side DC terminal and a first negative-side DC terminal that receive DC power from the DC common bus;
- a second negative-side DC terminal that is different from the first negative-side DC terminal;
- a smoothing unit that stores DC power supplied from the first positive-side DC terminal and the first negative-side DC terminal;
- a DC/AC conversion unit that converts DC power supplied from the smoothing unit to AC power; and
- a current-path changing unit that includes
  - a switching element that is arranged on a first current path in which current flows through the first negative-side DC terminal during powering,
  - a reverse-connected diode that is arranged on a second current path in which current flows through the second negative-side DC terminal during regeneration, and
  - a charging resistor that is arranged on the second current path such that the charging resistor is connected in series with the reverse-connected diode and in which current through the first negative-side DC terminal also flows when a smoothing capacitor of the smoothing unit is initially charged, wherein an external resistor is connected between the first negative-side DC terminal and the second negative-side DC terminal such that the first negative-side DC terminal becomes an end whose potential is same as that of a negative-side bus of the DC common bus.

10. An inverter device that receives DC power from a DC common bus and drives a load, comprising:
- a first positive-side DC terminal and a first negative-side DC terminal that receive DC power from the DC common bus;
- a second negative-side DC terminal that is different from the first negative-side DC terminal;
- a smoothing unit that stores DC power supplied from the first positive-side DC terminal and the first negative-side DC terminal;
- a DC/AC conversion unit that converts DC power supplied from the smoothing unit to AC power; and
- a current-path changing unit that includes
  - a switching element that is arranged on a first current path in which current flows through the first negative-side DC terminal during powering,
  - a reverse-connected diode that is arranged on a second current path in which current flows through the first negative-side DC terminal during regeneration, and
  - a charging resistor that is arranged on a third current path in which current flows through the first negative-side DC terminal when a smoothing capacitor of the smoothing unit is initially charged, wherein an external resistor is connected between the first negative-side DC terminal and the second negative-side DC terminal and a powering diode is connected across the external resistor in a direction in which powering current flows such that the second negative-side DC terminal becomes an end whose potential is same as that of a negative-side bus of the DC common bus.

* * * * *